(12) United States Patent
Wang et al.

(10) Patent No.: US 12,216,768 B2
(45) Date of Patent: Feb. 4, 2025

(54) ASSET SCORING METHOD AND APPARATUS, COMPUTER DEVICE, AND STORAGE MEDIUM

(71) Applicant: DBAPPSECURITY CO., LTD, Hangzhou (CN)

(72) Inventors: Wei Wang, Hangzhou (CN); Yuan Fan, Hangzhou (CN)

(73) Assignee: DBAPPSECURITY CO., LTD, Hangzhou (CN)

( * ) Notice: Subject to any disclaimer, the term of this patent is extended or adjusted under 35 U.S.C. 154(b) by 233 days.

(21) Appl. No.: 18/020,086

(22) PCT Filed: Apr. 28, 2021

(86) PCT No.: PCT/CN2021/090388
§ 371 (c)(1),
(2) Date: Feb. 7, 2023

(87) PCT Pub. No.: WO2022/028012
PCT Pub. Date: Feb. 10, 2022

(65) Prior Publication Data
US 2023/0315863 A1 Oct. 5, 2023

(30) Foreign Application Priority Data
Aug. 7, 2020 (CN) .......................... 202010788429.7

(51) Int. Cl.
*G06F 21/00* (2013.01)
*G06F 21/57* (2013.01)
(52) U.S. Cl.
CPC ................. *G06F 21/577* (2013.01)

(58) Field of Classification Search
None
See application file for complete search history.

(56) References Cited

U.S. PATENT DOCUMENTS 8,438,643 B2 * 5/2013 Wiemer ............... G06F 21/577
709/224
9,516,053 B1 * 12/2016 Muddu ............... G06F 16/9024
(Continued)

FOREIGN PATENT DOCUMENTS

| CN | 106789955 A | 5/2017 |
| CN | 106960269 A | 7/2017 |

(Continued)

OTHER PUBLICATIONS

Wei, Dan et al. Research on Multidimensional Information Security Assessment Based on Big Data. 2019 International Conference on Computer Network, Electronic and Automation (ICCNEA). https://ieeexplore.ieee.org/stamp/stamp.jsp?tp=&arnumber=8912106 (Year: 2019).*

(Continued)

*Primary Examiner* — Jeremiah L Avery (57) ABSTRACT

An asset scoring method and apparatus, a computer device, and a storage medium are provided. The method includes: obtaining multi-dimensional threat information data of assets to be assessed; obtaining sub-scores of dimensions according to the multi-dimensional threat information data and a preset security scoring model; according to the sub-scores of the dimensions, determining a security scoring result of the corresponding assets to be assessed; and according to the security scoring result and a preset level division rule, determining security levels of the corresponding assets to be assessed.

20 Claims, 1 Drawing Sheet

(56) References Cited

U.S. PATENT DOCUMENTS

| | | | |
|---|---|---|---|
| 10,440,048 B1* | 10/2019 | Li | H04L 63/1441 |
| 10,817,604 B1* | 10/2020 | Kimball | G06F 21/563 |
| 11,100,221 B2* | 8/2021 | Putman | G06F 21/566 |
| 11,443,035 B2* | 9/2022 | Chhabra | H04L 67/306 |
| 11,620,389 B2* | 4/2023 | Karabatis | G06F 18/24 |
| | | | 726/25 |
| 2008/0172739 A1* | 7/2008 | Nakae | H04L 63/20 |
| | | | 726/22 |
| 2011/0178933 A1* | 7/2011 | Bailey, Jr. | H04L 63/20 |
| | | | 726/1 |
| 2013/0104236 A1* | 4/2013 | Ray | H04L 63/20 |
| | | | 726/25 |
| 2013/0276125 A1* | 10/2013 | Bailey | G06F 21/46 |
| | | | 726/25 |
| 2017/0070523 A1* | 3/2017 | Bailey | G06F 16/285 |
| 2017/0230391 A1* | 8/2017 | Ferguson | G06N 7/01 |
| 2018/0307859 A1* | 10/2018 | LaFever | H04L 63/20 |
| 2019/0028492 A1* | 1/2019 | Coleman | G08B 21/182 |
| 2019/0236661 A1* | 8/2019 | Hogg | G06Q 30/0641 |
| 2020/0097663 A1 | 3/2020 | Sato et al. | |
| 2024/0378516 A1* | 11/2024 | Waldron | G16H 40/00 |
| 2024/0380670 A1* | 11/2024 | Subramanian | H04L 41/145 |

FOREIGN PATENT DOCUMENTS

| | | |
|---|---|---|
| CN | 110852641 A | 2/2020 |
| CN | 112019521 A | 12/2020 |
| WO | WO2018098294 A1 | 5/2018 |

OTHER PUBLICATIONS

Ghedini, Cinara Guellner et al. A framework for vulnerability management in complex networks. 2009 International Conference on Ultra Modern Telecommunications & Workshops. https://ieeexplore.ieee.org/stamp/stamp.jsp?tp=&arnumber=5345578 (Year: 2009).*

Owen, Chris et al. PRISM: Program Replication and Integration for Seamless MILS. 2011 IEEE Symposium on Security and Privacy. https://ieeexplore.ieee.org/stamp/stamp.jsp?tp=&arnumber=5958035 (Year: 2011).*

International Search Report of PCT/CN2021/090388.

China Office Action of 202010788429.7.

* cited by examiner

ASSET SCORING METHOD AND APPARATUS, COMPUTER DEVICE, AND STORAGE MEDIUM

CROSS-REFERENCE TO RELATED APPLICATIONS

This application is a U.S. national phase application under 35 U.S.C. § 371 base upon international patent application No. PCT/CN2021/090388, filed on Apr. 28, 2021, titled "ASSET SCORING METHOD AND APPARATUS, COMPUTER DEVICE, AND STORAGE MEDIUM", which itself claims priority to Chinese patent application No. 202010788429.7, filed on Aug. 7, 2020, titled "ASSET SCORING METHOD AND APPARATUS, COMPUTER DEVICE, AND STORAGE MEDIUM", both of which are hereby incorporated by reference.

TECHNICAL FIELD

The present disclosure relates to the field of information security, and in particular, to an asset scoring method and apparatus, a computer device, and a storage medium.

BACKGROUND

With a deepening of information technology, almost all equipment assets should be connected to a network to operate better and serve an enterprise better, but with this comes more risks-network threats. However, network threats are becoming increasingly rampant, and equipment assets those are connected to the network need specific protection to prevent threats from becoming incidents and causing damage.

A usual approach to protection is to put on all the protection which is too wasteful of resources. Quantitative analysis of security status of equipment assets in response to network threats can effectively reduce loss of assets for the enterprise. However, the related asset scoring methods generally set a time period or a weight as a configurable item, it is difficult to make specific disposition of network threats in the scoring results according to actual usage scenes, and it is difficult to accurately obtain a threat type and a security situation of the equipment assets. Thus, it is impossible to make targeted protection according to the network threats, and the reference of the related asset scoring methods is poor.

SUMMARY

The present disclosure provides an asset scoring method and apparatus, a computer device, and a storage medium, to at least solve a problem of difficulty in accurately obtaining the threat type and the security situation of the equipment device in related art.

In a first aspect, the present disclosure provides an asset scoring method, including: obtaining multi-dimensional threat information data of assets to be assessed; obtaining sub-scores of dimensions according to the multi-dimensional threat information data and a preset security scoring model; determining a security scoring result of the corresponding assets to be assessed according to the sub-scores of the dimensions; and determining security levels of the corresponding assets to be assessed according to the security scoring result and a preset level division rule.

In an embodiment, the dimensions include an incident status, a vulnerability status, and a failure status.

In an embodiment, the obtaining sub-scores of dimensions according to the multi-dimensional threat information data and the preset security scoring model further includes: obtaining a total amount of threat data in each dimension and an amount of threat data in each dimension level corresponding to each dimension, wherein each dimension includes at least two dimension levels; calculating, based on the amount of threat data in each dimension level and the total amount of threat data in a corresponding dimension, a threat probability corresponding to each dimension level in each dimension; and taking the threat probability corresponding to each dimension level in the same dimension and the total amount of threat data in the corresponding dimension as input to the security scoring module, and obtaining the sub-score of the corresponding dimension.

In an embodiment, the determining the security scoring result of the corresponding assets to be assessed according to the sub-scores of the dimensions further includes: when all the sub-scores are greater than zero, summing the sub-scores of all dimensions to obtain the security scoring result of the corresponding assets to be assessed.

In an embodiment, the determining the security scoring result of the corresponding assets to be assessed according to the sub-scores of the dimensions further includes: when the sub-scores are less than zero, resetting the corresponding sub-scores to zero; and summing the sub-scores of all dimensions to obtain the security scoring result of the corresponding assets to be assessed.

In an embodiment, a formula for calculating, based on the amount of threat data in each dimension level and the total amount of threat data in the corresponding dimension, the threat probability corresponding to each dimension level in each dimension is as follows:

$$D_i = N_i/\text{sum} * \lambda$$

the threat probability corresponding to a dimension level i in a dimension D is denoted as $D_i$, the amount of threat data corresponding to the dimension level i in the dimension D is denoted as $N_i$, the total amount of threat data in the dimension D is denoted as sum, and a threat coefficient corresponding to the dimension level i is denoted as $\lambda$.

In an embodiment, a formula for taking the threat probability corresponding to each dimension level in the same dimension and the total amount of threat data in the corresponding dimension as input to the security scoring module, and obtaining the sub-score of the corresponding dimension is as follows:

$$S_D = W_1 - W_1(D_1 + D_2 + \ldots D) - \text{sum} * W_2$$

the sub-score of a dimension D is denoted as $S_D$, a weight of the dimension D is denoted as $W_1$, the threat probability corresponding to a dimension level i in the dimension D is denoted as $D_i$, the total amount of threat data in the dimension D is denoted as sum, and a weight of the total amount of threat data in the dimension D is denoted as $W_2$.

In a second aspect, the present disclosure provides an asset scoring apparatus, including:
 a threat information data obtaining unit, configured for obtaining multi-dimensional threat information data of assets to be assessed;
 a sub-score obtaining unit, configured for obtaining sub-scores of dimensions according to the multi-dimensional threat information data and a preset security scoring model; a security scoring result determining unit, configured for determining a security scoring result of the corresponding assets to be assessed according to the sub-scores of the dimensions; and a security level determining unit, configured for determining security levels of the corresponding assets to be assessed according to the security scoring result and a preset level division rule.

In a third aspect, the present disclosure provides a computer device, including a processor and a memory that stores a computer program running on the processor, and the computer program is executed by the processor to implement the steps of the above asset scoring method.

In a fourth aspect, the present disclosure provides a storage medium having stored a computer program, and the computer program is executed by a processor to implement the steps of the above asset scoring method.

The present disclosure provides the asset scoring method and apparatus, the computer device, and the storage medium. The sub-scores of dimensions may be obtained according to the multi-dimensional threat information data and a preset security scoring model, to determine the security scoring result of the corresponding assets to be assessed, and finally security levels of the corresponding assets to be assessed may be determined according to the security scoring result and the preset level division rule. In the above method, the dimensions of threat information data may be configured according to actual scenes, and the security scoring result and security levels may be derived by integrating data in each dimension, which more accurately reflects network security statuses of the assets to be assessed.

The details of one or more embodiments of the present disclosure are set forth in the accompanying drawings and the description below. Other features, objects and advantages of the present disclosure will become apparent from the description and drawings.

BRIEF DESCRIPTION OF THE DRAWINGS

The drawings illustrated herein are used to provide a further understanding of the present disclosure, constituting part of the present disclosure. Illustrative embodiments of the present disclosure and its description used for explain the present disclosure, are not construed as an undue qualification of the present disclosure. In the drawings.

In the figures, 100 represents a threat information data obtaining unit, 200 represents a sub-score obtaining unit, 300 represents a security scoring result determining unit, 400 represents a security level determining unit, 30 represents a bus, 31 represents a processor, 32 represents a memory, and 33 represents a communication interface.

DETAILED DESCRIPTION

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure.

It is apparent that the accompanying drawings in the following description are only some examples or embodiments of the present disclosure, and that the present disclosure may be applied to other similar scenes in accordance with these drawings without creative labor for those skilled in the art. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods, systems, products, or devices including a series of steps or modules (units) are not limited to listed steps or units, but may include steps or units not listed, or may include other steps or units inherent in those processes, methods, products, or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. The character "/" indicates that the objects associated with each other are in an "or" relationship. The terms "first", "second", "third", etc. involved in the present disclosure are only configured for distinguishing similar objects, and do not represent a specific order of the objects.

Figure 1:
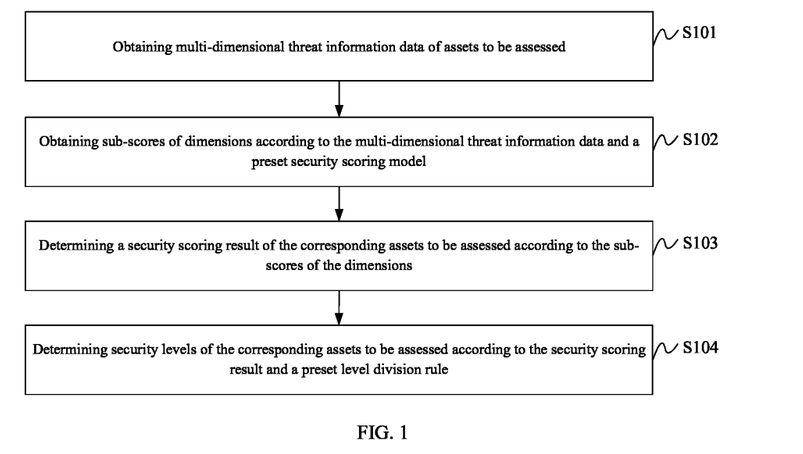
FIG. 1 is a flowchart of an asset scoring method in an embodiment of the present disclosure.

The present disclosure provides an asset scoring method, which may be applied in general network environments such as a local area network, a metropolitan area network, and the Internet, and may also be applied in complex network environments such as a private network, the Internet of Things, and various service systems. The method may be performed by a computer device, specifically, by one or more processors within the device, including at least the following steps 101 to 104.

At step 101, obtaining multi-dimensional threat information data of assets to be assessed.

In the present embodiment, asset scoring devices may include, but are not limited to, personal computers, laptops, smartphones, camera devices, tablets, and portable wearable devices. The assets to be assessed may be a collective term for corporate or personal fixed assets, such as physical servers, workstations, PCs, network devices (switches, routers), mobile devices, etc., without specific limitation in the present disclosure. The assets to be assessed may be connected to the network environment by wired or wireless means, and multi-dimensional network threats may be existed. When receiving network threats of different dimensions, it is easy to cause problems such as information leakage, override control, system denial of service, unauthorized access, command execution, propagation of viruses, etc., which may in turn generate multi-dimensional threat information data.

Specifically, in the multi-dimensional threat information data, the dimensions may include an incident status, a vulnerability status, and a failure status. The incident status refers to an attacked status of the assets to be assessed, which can specifically be the number of incidents of damage, spoofing, and theft of data information in an unauthorized manner by exploiting vulnerabilities and security flaws of the assets. The failure status may include statuses where a host or other networked device is successfully compromised and remotely controlled by an attacker or malicious behavior. In other embodiments, the dimensions may also include an alarm status, a virus status, a network status, etc. The dimensions may be configured according to a security status and threat to the assets to be assessed in the network, without specific limitation in the present disclosure.

In the present disclosure, security tools, specifically vulnerability scanning tools, such as firewalls, intrusion detection systems (IDS), OpenVAS, etc. may be used to obtain corresponding threat information data, which may be pre-processed with filtering, de-duplication, and formatting to provide data sources for next sub-score calculation and security level classification.

At step 102, obtaining sub-scores of dimensions according to the multi-dimensional threat information data and a preset security scoring model.

In the present disclosure, the preset security scoring model may be pre-designed based on a time period, a category, and a weight which are obtained according to the threat information data, to accurately reflect impact of the threat information data on sub-scoring results of each dimension. After the multi-dimensional threat information data is obtained, sub-scores of each dimension may be further calculated based on the security scoring model. Since the sub-scores are calculated based on each dimension, the results may more accurately reflect security statuses of each dimension of the assets to be assessed, enabling an owner to accurately grasp the network threat statuses of the assets in all aspects and providing a basis for network security management of the assets.

In the present disclosure, the owner of the assets to be assessed may formulate corresponding defense strategies for the sub-scores of the dimensions. For example, when the sub-score of the dimension "Vulnerability status" is high, an application access control restriction and an application upgrade will be carried out. When the sub-score of the dimension "failure status" is high, the Trojan horse detection will be carried out, etc.

At step 103, determining a security scoring result of the corresponding assets to be assessed according to the sub-scores of the dimensions.

Specifically, the step 103 may include steps 1031 to 1032.

At step 1031, when all the sub-scores are greater than zero, summing the sub-scores of all dimensions to obtain the security scoring result of the corresponding assets to be assessed.

At step 1032, when the sub-scores are less than zero, resetting the corresponding sub-scores to zero, and summing the sub-scores of all dimensions to obtain the security scoring result of the corresponding assets to be assessed.

In the present disclosure, when all the sub-scores are greater than zero, it may indicate that network threats are present in all pre-configured dimensions, and the sum of the sub-scores of all dimensions may be the security scoring result of the assets to be assessed. When the sub-scores are less than zero, it may indicate that the dimensions corresponding to the sub-scores have less threat information data and threat levels of the dimensions are lower, and the corresponding sub-scores may be set to zero.

At step 104, determining security levels of the corresponding assets to be assessed according to the security scoring result and a preset level division rule.

In the present disclosure, the preset level division rule may be a preset plurality of security grade regions, e.g., when a range of the security scoring result is [0, 100], four security grade regions may be divided: high risk [0, 60), medium risk [60, 75), low risk [75, 95), and safe [95, 100]. When the security scoring result of the assets to be assessed is lower, the security levels of the corresponding assets to be assessed may be lower. When the security scoring result of the assets to be assessed is higher, the security levels of the corresponding assets to be assessed may be higher.

In the asset scoring method provided in the above embodiment, the sub-scores of dimensions may be obtained according to the multi-dimensional threat information data and the preset security scoring model, to determine the security scoring result of the corresponding assets to be assessed, and finally security levels of the corresponding assets to be assessed may be determined according to the security scoring result and the preset level division rule. In the above method, the dimensions of threat information data may be configured according to actual scenes, and the security scoring result and security levels may be derived by integrating data in each dimension, which more accurately reflects network security statuses of the assets to be assessed, enabling the owner to accurately grasp the network threat status of the assets in all aspects.

In an embodiment, the obtaining sub-scores of dimensions according to the multi-dimensional threat information data and the preset security scoring model may include steps 1021 to 1023.

At step 1021, obtaining a total amount of threat data in each dimension and an amount of threat data in each dimension level corresponding to each dimension, and each dimension may including at least two dimension levels.

At step 1022, calculating, based on the amount of threat data in each dimension level and the total amount of threat data in a corresponding dimension, a threat probability corresponding to each dimension level in each dimension.

Specifically, in the present disclosure, each dimension may be divided into at least two dimension levels based on the threat information data in each dimension. For example, each dimension may be divided into two levels of a high risk level and a low risk level, or into three levels of a high risk level, a medium risk level, and a low risk level. The threat information data of the assets to be assessed may be obtained after series processing based on various types of logs of the assets to be assessed which are collected by various types of devices, or detecting and monitoring systems. Then the total amount of threat information data of each dimension and the amount of threat data in each dimension level may be obtained.

It should be noted that in the present embodiment, a data obtaining time period of the above threat information data may be preset. For example, seconds, minutes, days, weeks, months, years may be set as the data obtaining time period. The data in the time period may be calculated, a calculation with a full amount of data in a context of big data may be not easy to achieve, and the reference may be not meaningful.

Specifically, a formula for calculating, based on the amount of threat data in each dimension level and the total amount of threat data in the corresponding dimension, the threat probability corresponding to each dimension level in each dimension may be as follows:

$$D_i = N_i/\text{sum} * \lambda$$

the threat probability corresponding to a dimension level i in a dimension D may be denoted as $D_i$, the amount of threat data corresponding to the dimension level i in the dimension D may be denoted as $N_i$, the total amount of threat data in the dimension D may be denoted as sum, and a threat coefficient corresponding to the dimension level i may be denoted as $\lambda$.

Specifically, the threat information data of the assets to be assessed may have a plurality of dimensions, each of which may be divided into three dimension levels of the high risk level, the medium risk level, and the low risk level. Each dimension level may have a corresponding threat coefficient. The threat probability may be set higher for a higher dimension level and lower for a lower dimension level.

In a specific embodiment, the total amount of threat data in an incident status dimension may be denoted as sum. The amount of threat data in a first dimension level (the high risk level) may be denoted as x, a corresponding threat coefficient denoted as $\lambda_1$ may be equal to 0.5, and a corresponding threat probability may be denoted as $D_i$. The amount of threat data in a second dimension level (the medium risk level) may be denoted as y, a corresponding threat coefficient denoted as $\lambda_2$ may be equal to 0.3, and a corresponding threat probability may be denoted as $D_2$. The amount of threat data in a third dimension level (the low risk level) may be denoted as z, a corresponding threat coefficient denoted as $\lambda_3$ may be equal to 0.2, and a corresponding threat probability may be denoted as $D_3$.

$$D_1 = x/\text{sum} * 0.5$$

$$D_2 = y/\text{sum} * 0.3$$

$$D_3 = z/\text{sum} * 0.2$$

At step 1023, taking the threat probability corresponding to each dimension level in the same dimension and the total amount of threat data in the corresponding dimension as input to the security scoring module, and obtaining the sub-score of the corresponding dimension.

Specifically, a formula for taking the threat probability corresponding to each dimension level in the same dimension and the total amount of threat data in the corresponding dimension as input to the security scoring module, and obtaining the sub-score of the corresponding dimension may be as follows:

$$S_D = W_1 - W_1(D_1 + D_2 + \ldots D) - \text{sum} * W_2$$

the sub-score of a dimension D may be denoted as $S_D$, a weight of the dimension D may be denoted as $W_1$, the threat probability corresponding to a dimension level i in the dimension D may be denoted as $D_i$, the total amount of threat data in the dimension D may be denoted as sum, and a weight of the total amount of threat data in the dimension D may be denoted as $W_2$.

In the present disclosure, after obtaining the threat probability corresponding to each dimension level in each dimension in the threat information data of the assets to be assessed, the sub-score of the corresponding dimension may be calculated and obtained according to the security scoring model described above.

In the present disclosure, the dimensions affecting the assets to be assessed and weight corresponding to each dimension may be preset in the security scoring model. The weight may be set as a percentage system, and the weight may be introduced according to the threat level of the corresponding dimension, so that the scoring result may be more comprehensive and objective.

In particular, the sub-score $S_D$ of the dimension may be not only related to the weight $W_1$ (the threat level) and the threat probability D of the dimension, but also related to the total amount of threat data sum of the corresponding dimension. The weight $W_2$ of the total amount of threat data may be adjusted according to an actual data status (e.g., an amount of data, a time period length of selected data).

In a specifical embodiment, the threat information data of the assets to be assessed may include the incident status denoted as E, the vulnerability status denoted as V, the failure status denoted as P, and the weight $W_2$ of the total amount of threat data may be equal to 0.001. The proportion of the incident status E may be 40%, the proportion of the vulnerability status V may be 30%, the proportion of the failure status P may be 30%, and the total proportion may be 100%. The weights of the incident status E, the vulnerability status V, and the failure status P may be 40, 30, and 30, respectively.

For the incident status E, the threat probability corresponding to the first dimension level, the second dimension level, and the third dimension level may be $E_1$, $E_2$, and $E_3$, respectively, the total amount of threat data may be sum (E), and the sub-score of the incident status E may be:

$$S_E = 40 - 40(E_1 + E_2 + E_3) - \text{sum}(E) * 0.001$$

For the vulnerability status V, the threat probability corresponding to the first dimension level, the second dimension level, and the third dimension level may be $V_1$, $V_2$, and $V_3$, respectively, the total amount of threat data may be sum (V), and the sub-score of the vulnerability status V may be:

$$S_V = 30 - 30(V_1 + V_2 + V_3) - \text{sum}(V) * 0.001$$

For the failure status P, the threat probability corresponding to the first dimension level, the second dimension level, and the third dimension level may be $P_1$, $P_2$, and $P_3$, respectively, the total amount of threat data may be sum (P), and the sub-score of the failure status P may be:

$$S_P = 30 - 30(P_1 + P_2 + P_3) - \text{sum}(P) * 0.001$$

In the above embodiment, the sub-score of each dimension affecting the assets to be assessed may be calculated by the preset security scoring model. The higher the security score is, the higher the security level is, and the safer the assets to be assessed are. Security maintainers or manager may understand a network threat status of corresponding dimension according to the sub-score. For example, the assets may receive someone threat from a multi-dimensional observation, etc., so that the threat may be classified and analyzed according to the threat level, a specific protection may be taken according to a specific threat, and different protection policies may be specified for different assets, respectively.

It should be understood that although the steps in the flowchart of FIG. 1 to FIG. 16 are shown sequentially as indicated by the arrows, the steps are not necessarily performed sequentially in the order indicated by the arrows. Except as expressly stated herein, the execution of these steps is not limited to a strict sequence, and these steps may be executed in other orders. Moreover, at least some of the steps in FIG. 1 may include multiple sub-steps or multiple stages that are not necessarily performed at the same time, but may be performed at different times, and the order in which these sub-steps or stages are performed is not necessarily sequential, but may alternate with other steps or at least some of the sub-steps or stages of other steps.

The present disclosure further provides an asset scoring apparatus, which is configured to implement the above embodiments and alternative implementations, which have been described without further elaboration. As used below, the terms "module", "unit", "sub-unit", "sub-module", etc. may implement a combination of software and/or hardware with a preset function. Although the apparatus described in the following embodiments are preferably implemented in software, implementations of hardware, or combinations of software and hardware, are also possible and contemplated.

Figure 2:
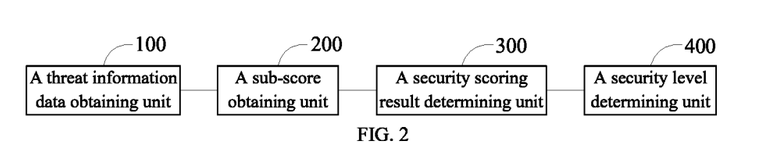
FIG. 2 is a schematic diagram of an asset scoring apparatus in an embodiment of the present disclosure.

FIG. 2 is a schematic diagram of the asset scoring apparatus in an embodiment of the present disclosure. The asset scoring apparatus may include a threat information data obtaining unit 100, a sub-score obtaining unit 200, a security scoring result determining unit 300, and a security level determining unit 400.

The threat information data obtaining unit 100 may be configured for obtaining multi-dimensional threat information data of assets to be assessed.

The sub-score obtaining unit 200 may be configured for obtaining sub-scores of dimensions according to the multi-dimensional threat information data and a preset security scoring model.

The security scoring result determining unit 300 may be configured for determining a security scoring result of the corresponding assets to be assessed according to the sub-scores of the dimensions.

The security level determining unit 400 may be configured for determining security levels of the corresponding assets to be assessed according to the security scoring result and a preset level division rule.

The sub-score obtaining unit 200 may include an amount of threat data obtaining module, a threat probability obtaining module, and a sub-score obtaining module.

The amount of threat data obtaining module may be configured for obtaining a total amount of threat data in each dimension and an amount of threat data in each dimension level corresponding to each dimension. Each dimension may include at least two dimension levels.

The threat probability obtaining module may be configured for calculating, based on the amount of threat data in each dimension level and the total amount of threat data in a corresponding dimension, a threat probability corresponding to each dimension level in each dimension.

The sub-score obtaining module may be configured for taking the threat probability corresponding to each dimension level in the same dimension and the total amount of threat data in the corresponding dimension as input to the security scoring module, and obtaining the sub-score of the corresponding dimension.

The security scoring result determining unit 300 may include a first security scoring result obtaining module.

The first security scoring result obtaining module may be configured for summing the sub-scores of all dimensions, to obtain the security scoring result of the corresponding assets to be assessed, when all the sub-scores are greater than zero.

The security scoring result determining unit 300 may further include a resetting module and a second security scoring result obtaining module.

The resetting module may be configured for resetting the corresponding sub-scores to zero when the sub-scores are less than zero.

The second security scoring result obtaining module may be configured for summing the sub-scores of all dimensions to obtain the security scoring result of the corresponding assets to be assessed.

In the threat probability obtaining module, a formula may be as follows:

$$D_i = N_i / \text{sum} * \lambda$$

the threat probability corresponding to a dimension level i in a dimension D may be denoted as $D_i$, the amount of threat data corresponding to the dimension level i in the dimension D may be denoted as $N_i$, the total amount of threat data in the dimension D may be denoted as sum, and a threat coefficient corresponding to the dimension level i may be denoted as $\lambda$.

In the sub-score obtaining module, a formula may be as follows:

$$S_D = W_1 - W_1(D_1 + D_2 + \ldots D) - \text{sum} * W_2$$

the sub-score of a dimension D may be denoted as SD, a weight of the dimension D may be denoted as W1, the threat probability corresponding to a dimension level i in the dimension D may be denoted as $D_i$, the total amount of threat data in the dimension D may be denoted as sum, and a weight of the total amount of threat data in the dimension D may be denoted as W2.

Specific limitations of the asset scoring apparatus may be found in limitations of the asset scoring method above and would not be repeated herein. Individual modules in the above asset scoring apparatus may be implemented in whole or in part by software, hardware, and combinations thereof. Each of the above modules may be embedded in hardware form or independent of a processor in a computer device, or may be stored in software form in a memory in the computer device, resulting in that the processor may be called to perform operations corresponding to each of the above modules.

Figure 3:
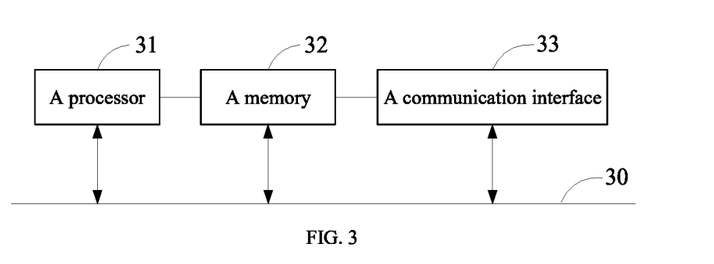
FIG. 3 is a schematic diagram of an internal structure of a computer device in an embodiment of the present disclosure.

In addition, the asset scoring method provided in the embodiments of the present disclosure described in FIG. 1 may be implemented by a computer device. FIG. 3 is a schematic diagram of an internal structure of the computer device in an embodiment of the present disclosure.

The computer device may include a processor 31 and a memory 32 that stores computer program instructions.

Specifically, the above processor 31 may include a central processing unit (CPU), or an Application Specific Integrated Circuit (ASIC). The processor 31 may be configured to implement one or more integrated circuits of embodiments in the present disclosure.

The memory 32 may include a mass storage for data or instructions. For example, and not as a limitation, the memory 32 may include a Hard Disk Drive (HDD), a floppy disk drive, a Solid State Drive (SSD), a flash memory, an optical disk, a magnetic disk, a magnetic tape, a Universal Serial Bus (USB) drive, or a combination of two or more of the above. In an appropriate situation, the memory 32 may include removable or non-removable (or fixed) media. In an appropriate situation, the memory 32 may be internal or external to a data processing device. In particular embodiments, the memory 32 may be a Non-Volatile memory. In particular embodiments, the memory 32 may include a Read-Only Memory (ROM) and a Random Access Memory (RAM). In an appropriate situation, the ROM may be a mask-programmed ROM, a Programmable Read-Only Memory (PROM), an Erasable Programmable Read-Only Memory (EPROM), an Electrically Erasable Programmable Read-Only Memory (EEPROM), an Electrically Alterable Read-Only Memory (EAROM), a Flash Memory (FLASH), or a combination of two or more of the above. In an appropriate situation, the RAM may be a Static Random-Access Memory (SRAM) or a Dynamic Random Access Memory (DRAM). The DRAM may be a Fast Page Mode Dynamic Random Access Memory (FPMDRAM). The DRAM can be a Fast Page Mode Dynamic Random Access Memory (FPMDRAM), an Extended Data Out Dynamic Random Access Memory (EDODRAM), a Synchronous Dynamic Random-Access Memory (SDRAM), etc.

The memory 32 may be configured to store or cache various data files to be processed and/or be used for communication, as well as possible computer program instructions to be executed by the processor 31.

The processor 31 may implement any of the asset scoring methods in the above embodiments by reading and executing the computer program instructions stored in the memory 32.

In some embodiments, the computer device may further include a communication interface 33 and a bus 30. Referring to FIG. 3, the processor 31, the memory 32, and the communication interface 33 may be connected and in communication with each other via the bus 30.

The communication interface 33 may be configured to enable communication between the modules, devices, units, and/or equipment in embodiments in the present disclosure. The communication interface 33 may also enable data communication with other components, such as an external device, an image/data obtaining device, a database, an external storage, an image/data processing workstation, etc.

The bus 30 may include hardware, software, or both. The bus 30 may be configured for coupling components of the computer device to one another. The bus 30 may include, but is not limited to, at least one of the following: a Data Bus, an Address Bus, a Control Bus, an Expansion Bus, a Local Bus. For example, and not as a limitation, the bus 30 may include an Accelerated Graphics Port (AGP) or other graphics bus, an Extended Industry Standard Architecture (EISA) bus, a Front Side Bus (FSB), a Hyper Transport (HT) interconnect, an Industry Standard Architecture (ISA) bus, an InfiniBand interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, other appropriate bus, or a combination of two or more of the above. In an appropriate situation, the bus 30 may include one or more buses. Although particular buses may be described and illustrated in embodiments in the present disclosure, the present disclosure may contemplate any suitable bus or interconnect.

The computer device may execute the asset scoring method in embodiments in the present disclosure based on obtained computer program instructions, thereby implementing the asset scoring method described in conjunction with FIG. 1.

In addition, referring to the asset scoring method in the above-described embodiments, the present disclosure may provide a computer readable storage medium. The computer readable storage medium has stored computer program instructions, which are executed by a processor to implement the steps of any asset scoring method in the above embodiments.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:
1. An asset scoring method, comprising:
    obtaining multi-dimensional threat information data of assets to be assessed;
    obtaining sub-scores of dimensions according to the multi-dimensional threat information data and a preset security scoring model;
    determining a security scoring result of the corresponding assets to be assessed according to the sub-scores of the dimensions; and
    determining security levels of the corresponding assets to be assessed according to the security scoring result and a preset level division rule.

2. The asset scoring method of claim 1, wherein the dimensions comprise an incident status, a vulnerability status, and a failure status.

3. The asset scoring method of claim 1, wherein the obtaining sub-scores of dimensions according to the multi-dimensional threat information data and the preset security scoring model further comprises:
    obtaining a total amount of threat data in each dimension and an amount of threat data in each dimension level corresponding to each dimension, wherein each dimension comprises at least two dimension levels;
    calculating, based on the amount of threat data in each dimension level and the total amount of threat data in a corresponding dimension, a threat probability corresponding to each dimension level in each dimension; and
    taking the threat probability corresponding to each dimension level in the same dimension and the total amount of threat data in the corresponding dimension as input to the security scoring module, and obtaining the sub-score of the corresponding dimension.

4. The asset scoring method of claim 1, wherein the determining the security scoring result of the corresponding assets to be assessed according to the sub-scores of the dimensions further comprises:

when all the sub-scores are greater than zero, summing the sub-scores of all dimensions to obtain the security scoring result of the corresponding assets to be assessed.

5. The asset scoring method of claim 1, wherein the determining the security scoring result of the corresponding assets to be assessed according to the sub-scores of the dimensions further comprises:
when the sub-scores are less than zero, resetting the corresponding sub-scores to zero; and
summing the sub-scores of all dimensions to obtain the security scoring result of the corresponding assets to be assessed.

6. The asset scoring method of claim 3, wherein a formula for calculating, based on the amount of threat data in each dimension level and the total amount of threat data in the corresponding dimension, the threat probability corresponding to each dimension level in each dimension is as follows:

$$D_i = N_i/\text{sum}*\lambda$$

wherein the threat probability corresponding to a dimension level i in a dimension D is denoted as $D_i$, the amount of threat data corresponding to the dimension level i in the dimension D is denoted as $N_i$, the total amount of threat data in the dimension D is denoted as sum, and a threat coefficient corresponding to the dimension level i is denoted as $\lambda$.

7. The asset scoring method of claim 3, wherein a formula for taking the threat probability corresponding to each dimension level in the same dimension and the total amount of threat data in the corresponding dimension as input to the security scoring module, and obtaining the sub-score of the corresponding dimension is as follows:

$$S_D = W_1 - W_1(D_1 + D_2 + \ldots D) - \text{sum}*W_2$$

wherein the sub-score of a dimension D is denoted as $S_D$, a weight of the dimension D is denoted as $W_1$, the threat probability corresponding to a dimension level i in the dimension D is denoted as $D_i$, the total amount of threat data in the dimension D is denoted as sum, and a weight of the total amount of threat data in the dimension D is denoted as $W_2$.

8. A computer device, comprising a processor and a memory that stores a computer program running on the processor, wherein the computer program is executed by the processor to implement the steps of the asset scoring method of claim 1.

9. The computer device of claim 8, wherein the dimensions comprise an incident status, a vulnerability status, and a failure status.

10. The computer device of claim 8, wherein the obtaining sub-scores of dimensions according to the multi-dimensional threat information data and the preset security scoring model further comprises:
obtaining a total amount of threat data in each dimension and an amount of threat data in each dimension level corresponding to each dimension, wherein each dimension comprises at least two dimension levels;
calculating, based on the amount of threat data in each dimension level and the total amount of threat data in a corresponding dimension, a threat probability corresponding to each dimension level in each dimension; and
taking the threat probability corresponding to each dimension level in the same dimension and the total amount of threat data in the corresponding dimension as input to the security scoring module, and obtaining the sub-score of the corresponding dimension.

11. The computer device of claim 8, wherein the determining the security scoring result of the corresponding assets to be assessed according to the sub-scores of the dimensions further comprises:
when all the sub-scores are greater than zero, summing the sub-scores of all dimensions to obtain the security scoring result of the corresponding assets to be assessed.

12. The computer device of claim 8, wherein the determining the security scoring result of the corresponding assets to be assessed according to the sub-scores of the dimensions further comprises:
when the sub-scores are less than zero, resetting the corresponding sub-scores to zero; and
summing the sub-scores of all dimensions to obtain the security scoring result of the corresponding assets to be assessed.

13. The computer device of claim 10, wherein a formula for calculating, based on the amount of threat data in each dimension level and the total amount of threat data in the corresponding dimension, the threat probability corresponding to each dimension level in each dimension is as follows:

$$D_i = N_i/\text{sum}*\lambda$$

wherein the threat probability corresponding to a dimension level i in a dimension D is denoted as $D_i$, the amount of threat data corresponding to the dimension level i in the dimension D is denoted as $N_i$, the total amount of threat data in the dimension D is denoted as sum, and a threat coefficient corresponding to the dimension level i is denoted as $\lambda$.

14. The computer device of claim 10, wherein a formula for taking the threat probability corresponding to each dimension level in the same dimension and the total amount of threat data in the corresponding dimension as input to the security scoring module, and obtaining the sub-score of the corresponding dimension is as follows:

$$S_D = W_1 - W_1(D_1 + D_2 + \ldots D) - \text{sum}*W_2$$

wherein the sub-score of a dimension D is denoted as $S_D$, a weight of the dimension D is denoted as $W_1$, the threat probability corresponding to a dimension level i in the dimension D is denoted as $D_i$, the total amount of threat data in the dimension D is denoted as sum, and a weight of the total amount of threat data in the dimension D is denoted as $W_2$.

15. A storage medium having stored a computer program, wherein the computer program is executed by a processor to implement the steps of the asset scoring method of claim 1.

16. The storage medium of claim 15, wherein the dimensions comprise an incident status, a vulnerability status, and a failure status.

17. The storage medium of claim 15, wherein the obtaining sub-scores of dimensions according to the multi-dimensional threat information data and the preset security scoring model further comprises:
obtaining a total amount of threat data in each dimension and an amount of threat data in each dimension level corresponding to each dimension, wherein each dimension comprises at least two dimension levels;
calculating, based on the amount of threat data in each dimension level and the total amount of threat data in a corresponding dimension, a threat probability corresponding to each dimension level in each dimension; and taking the threat probability corresponding to each dimension level in the same dimension and the total amount of threat data in the corresponding dimension as input to the security scoring module, and obtaining the sub-score of the corresponding dimension.

18. The storage medium of claim 15, wherein the determining the security scoring result of the corresponding assets to be assessed according to the sub-scores of the dimensions further comprises:
when all the sub-scores are greater than zero, summing the sub-scores of all dimensions to obtain the security scoring result of the corresponding assets to be assessed.

19. The storage medium of claim 15, wherein the determining the security scoring result of the corresponding assets to be assessed according to the sub-scores of the dimensions further comprises:
when the sub-scores are less than zero, resetting the corresponding sub-scores to zero; and
summing the sub-scores of all dimensions to obtain the security scoring result of the corresponding assets to be assessed.

20. An asset scoring apparatus, comprising:
a threat information data obtaining unit, configured for obtaining multi-dimensional threat information data of assets to be assessed;
a sub-score obtaining unit, configured for obtaining sub-scores of dimensions according to the multi-dimensional threat information data and a preset security scoring model;
a security scoring result determining unit, configured for determining a security scoring result of the corresponding assets to be assessed according to the sub-scores of the dimensions; and
a security level determining unit, configured for determining security levels of the corresponding assets to be assessed according to the security scoring result and a preset level division rule.

* * * * *